Dec. 6, 1966    M. M. SCHWARTZ ETAL    3,290,157
CANDY SUCKER CONSTRUCTION
Filed Sept. 4, 1964
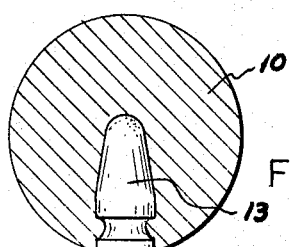
FIG. 2
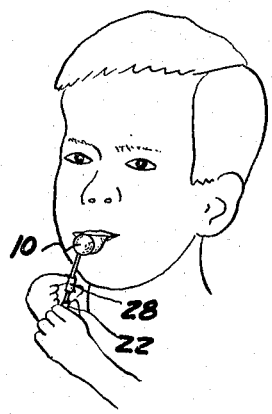
FIG. 1
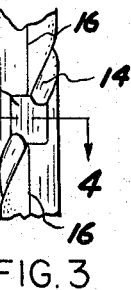
FIG. 4
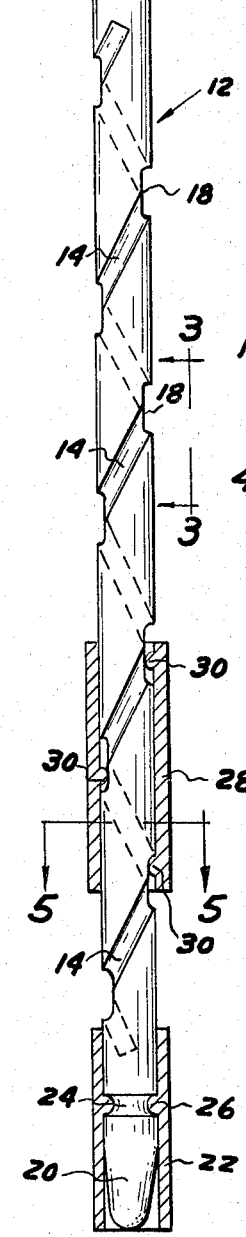
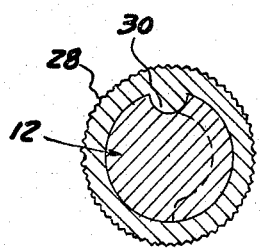
FIG. 3
FIG. 5
INVENTOR.
MARIUS M. SCHWARTZ
ARTHUR KOTLIER
BY
ATTORNEY

United States Patent Office 3,290,157
Patented Dec. 6, 1966

---

3,290,157
CANDY SUCKER CONSTRUCTION
Marius M. Schwartz, 20225 Stansbury, and Arthur Kotlier, 20200 St. Mary's, both of Detroit, Mich.
Filed Sept. 4, 1964, Ser. No. 394,421
3 Claims. (Cl. 99—138)

This invention relates to a lollipop or candy sucker for children and more particularly to a candy sucker in which the candy is rotated within the mouth of the child as it is consumed.

Children, when sucking or licking lollipops or suckers, will twirl the sucker so as to cause the candy to be uniformly reduced in size while it is being consumed. This twirling motion also produces a pleasurable effect for the child.

The present invention provides a candy sucker in which the candy can be twirled by the child simply by linearly moving a small member on the sucker stick. This is generally accomplished by employing a stick having a spiral groove along its length and a nut adapted to encompass the stick and engage the groove. By moving the nut linearly up and down, the child causes the candy portion to twirl.

The stick to be employed in this candy sucker is preferably molded of a suitable plastic. An inexpensive and satisfactory method of making molded items of this size is by injection molding wherein the molten plastic material is injected between a set of locked opposing die halves. After solidification of the plastic material, one of the dies is retracted and the molded product is removed. However, a spirally grooved stick ordinarily cannot be injection molded due to its shape. That is, the spiral grooves constitute a reentrant shape, and prevent the dies from being separated after hardening of the molded material without damaging the product. As a result, another more costly process would ordinarily have to be employed.

The present invention contemplates a spirally grooved stick or rod which can be formed by injection molding.

In a preferred embodiment of the invention which will be subsequently described in detail, the stick is provided with flattened or non-grooved portions at spaced points along the parting lines on the stick created by the die halves. These parting lines extend linearly along the length of the stick on two opposing sides thereof. The flattened portions are disposed at the intersection of the spiral groove with the plane of separation. A nut having an internal thread adapted to engage the groove encompasses a part of the length of the stick. In this manner, the nut alway engages a portion of the groove, although it also contacts the flattened portions. When these flattened portions are provided, the stick is no longer a reentrant shape and may be easily injection molded in a manner well known to that art. It is an object of the present invention to provide a candy sucker which may be actuated to twirl the candy in the mouth of the person consuming it.

Another object of the present invention is to provide a spirally grooved stick of the type described which can be injection molded.

Another object is to provide a candy confection and holder of this kind which is simple in design and inexpensive to manufacture.

Other objects and advantages of the present invention will be more apparent from the following detailed description of a preferred embodiment of the present invention. The description refers to the drawings in which:

FIGURE 1 is a perspective view of a child using the present invention;

FIGURE 2 is an elevational view partly in section of a preferred embodiment of the present invention;

FIGURE 3 is an elevational view taken along the lines 3—3 in FIGURE 2;

FIGURE 4 is a sectional view taken along the lines 4—4 in FIGURE 3; and

FIGURE 5 is a sectional view taken along the lines 5—5 in FIGURE 2.

Referring to the drawings in detail, the present invention generally comprises a candy portion 10 fixed on one end of a stick or cylindrical rod 12. The candy portion 10 which is mounted about a head portion 13 on the upper end of the stick, is preferably of a spherical or cylindrical configuration with a circular cross section in a plane normal to the longitudinal axis of the stick 12.

The stick 12 is provided with a spiral groove 14 extending substantially the length thereof. The stick is injection molded in a manner well known to the art. The lines 16 shown in FIGURE 3 are the parting lines created by the use of opposing die halves in this process. Flattened portions 18 are disposed along the stick at the intersections between the groove 14 and the parting lines 16.

When the groove 14 is flattened in this manner adjacent to the parting lines, the shape of the stick is no longer reentrant and consequently the stick may be injection molded without damaging the product.

At its lower end the stick 12 is provided with a headed portion 20. The headed portion is encompassed by a collar 22 which is rotatably mounted thereon. The collar is retained in place by a circular groove 24 in the head portion 20 which accepts a flange 26 projecting along the interior of the collar.

A nut 28 encompasses a portion of the stick 12. The nut includes a spiral thread 30 projecting inwardly along the inner portion of the nut and adapted to engage the groove 14. The thread 30 thus extends along the groove 14 and passes over the flattened portions 18. In this manner, the flattened portions 18 do not prevent the movement of the nut 28 along the length of the stick 12.

In operation, the candy portion 10 is placed in the mouth of the person desiring to consume the same and the collar 22 is grasped with the fingers of one hand as shown in FIGURE 1. The nut 28 is held with the fingers of the other hand and is urged upwards or downwards along the stick 12. This linear motion causes the stick 12 and candy 10 to rotate within the collar 22.

It should be noted that the nut 28 may include some other means other than the thread 30 engageable in the groove 14. For example, a plurality of pins may be employed, spaced apart so that at least one pin engages the groove 14 at all times.

Having thus described our invention, we claim:

1. In a candy sucker having a cylindrical injection-molded rod and candy mounted at one end thereof, the improvement comprising a spiral groove extending along the peripheral surface of said rod, a collar rotatably mounted at the end of said rod opposite to said candy, a nut mounted on said rod engaging said groove, and flattened surfaces on the periphery of said rod at each intersection of said groove with the parting lines created by said injection-molding.

2. In a candy sucker having a cylindrical injection-molded rod and candy mounted at one end thereof, the improvement comprising a spiral groove extending along the peripheral surface of said rod, a collar rotatably mounted at the end of said rod opposite to said candy, a nut mounted on said rod having an internal thread engaging said groove, and flattened surfaces on the periphery of said rod at each intersection of said groove with the parting lines created by said injection-molding.

3. In a candy sucker having a cylindrical injection-molded rod and candy mounted at one end thereof, the improvement comprising a spiral groove extending along the peripheral surface of said rod, a collar rotatably mounted at the end of said rod opposite to said candy, a nut mounted on said rod having a plurality of pins along its internal surface at least one of which engages said groove at any position of said nut on said rod, and flattened surfaces on the periphery of said rod at each intersection of said groove with the parting lines created by said injection-molding.

No references cited.

A. LOUIS MONACELL, *Primary Examiner.*

M. VOET, *Assistant Examiner.*